United States Patent
Heidbüchel et al.

(10) Patent No.: US 9,803,700 B2
(45) Date of Patent: Oct. 31, 2017

(54) CLUTCH RING GEAR ASSEMBLY AND METHOD OF CONSTRUCTION THEREOF

(71) Applicant: Magna Powertrain, Inc., Concord (CA)

(72) Inventors: Peter Heidbüchel, Sharon (CA); Liu Shunhua, Tianmen (CN); Zhao Quande, Changzhou (CN); Peng Sibo, Changzhou (CN)

(73) Assignee: MAGNA POWERTRAIN, INC., Concord (CA)

( * ) Notice: Subject to any disclaimer, the term of this patent is extended or adjusted under 35 U.S.C. 154(b) by 0 days.

(21) Appl. No.: 15/064,911

(22) Filed: Mar. 9, 2016

(65) Prior Publication Data

US 2017/0261044 A1   Sep. 14, 2017

(51) Int. Cl.
*F16D 13/58* (2006.01)
*F16D 13/64* (2006.01)

(52) U.S. Cl.
CPC ............ *F16D 13/58* (2013.01); *F16D 13/644* (2013.01); *F16D 2250/0061* (2013.01); *F16D 2300/12* (2013.01); *F16D 2300/26* (2013.01)

(58) Field of Classification Search
None
See application file for complete search history.

(56) References Cited

U.S. PATENT DOCUMENTS

| 4,580,673 A * | 4/1986 | Graton | F16D 13/64 188/218 XL |
|---|---|---|---|
| 7,975,820 B2 | 7/2011 | Uhler | |
| 7,996,977 B2 | 8/2011 | Herb | |
| 9,022,196 B2 | 5/2015 | Luipold | |
| 2015/0198193 A1* | 7/2015 | Szuba | F16B 17/002 403/280 |

* cited by examiner

*Primary Examiner* — Mark Manley
(74) *Attorney, Agent, or Firm* — Dickinson Wright PLLC

(57) ABSTRACT

A clutch ring gear assembly and method of construction thereof are provided. The assembly has a bearing seat including a flange extending radially outwardly from a central axis. The flange has a plurality of holes spaced circumferentially from one another about the central axis. A ring gear carrier includes a rim extending radially outwardly from the central axis. The rim has a plurality of through openings. Each of the through openings of the rim has an annular boss extending axially away from the rim in generally parallel relation to the central axis. The annular bosses are disposed within the holes and have hollow, annular end portions flared radially outwardly into engagement with the flange of said bearing seat to fixedly attach the ring gear carrier to the bearing seat.

20 Claims, 17 Drawing Sheets

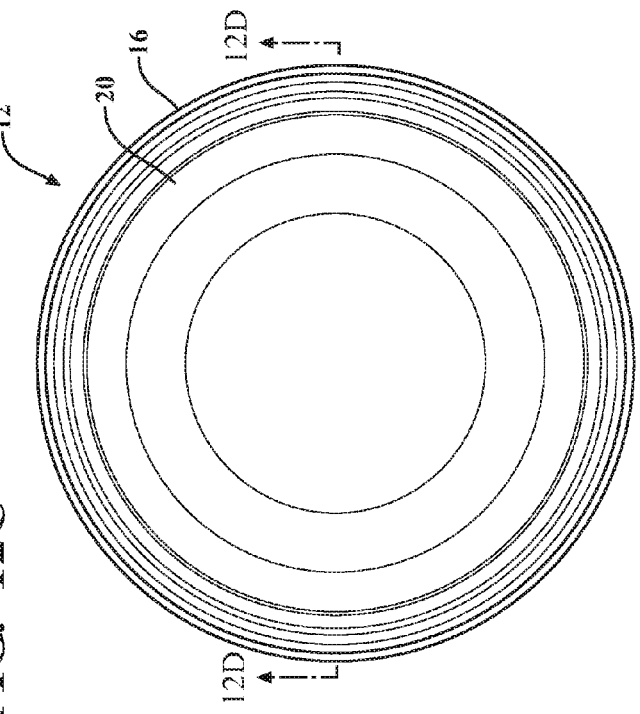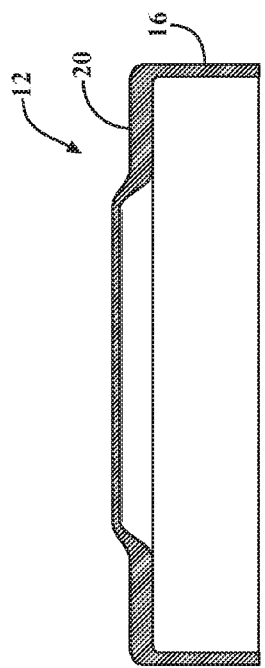
FIG. 12A  FIG. 12B
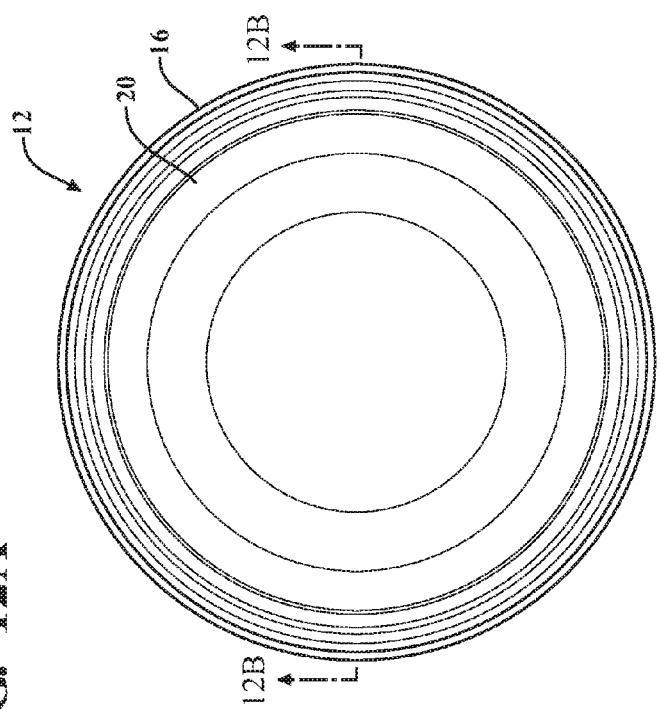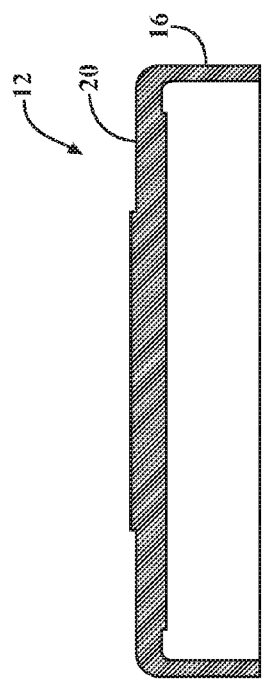
FIG. 12C  FIG. 12D

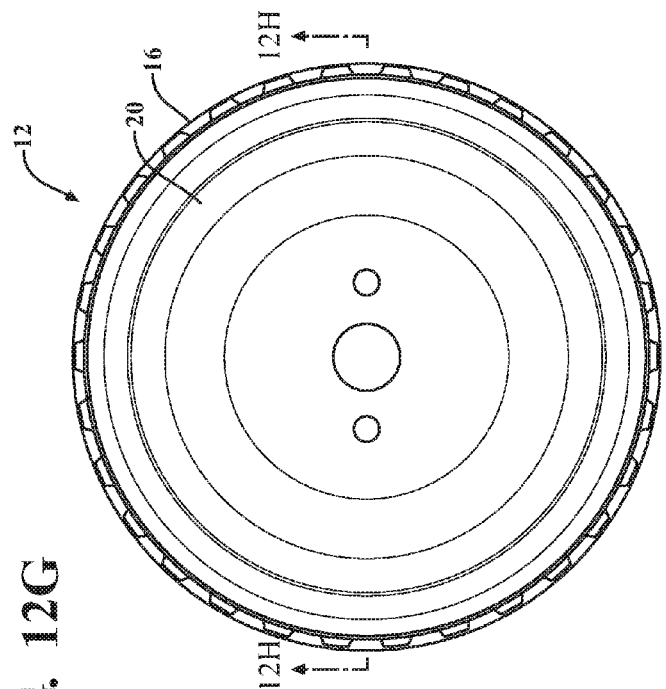
FIG. 12E  FIG. 12G
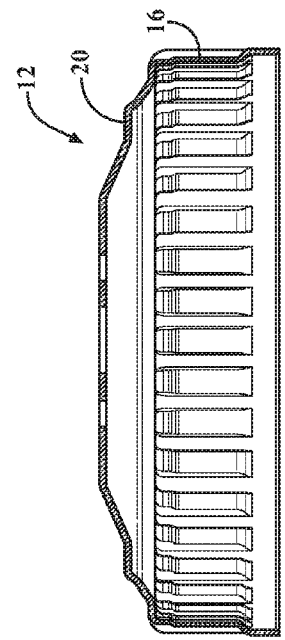
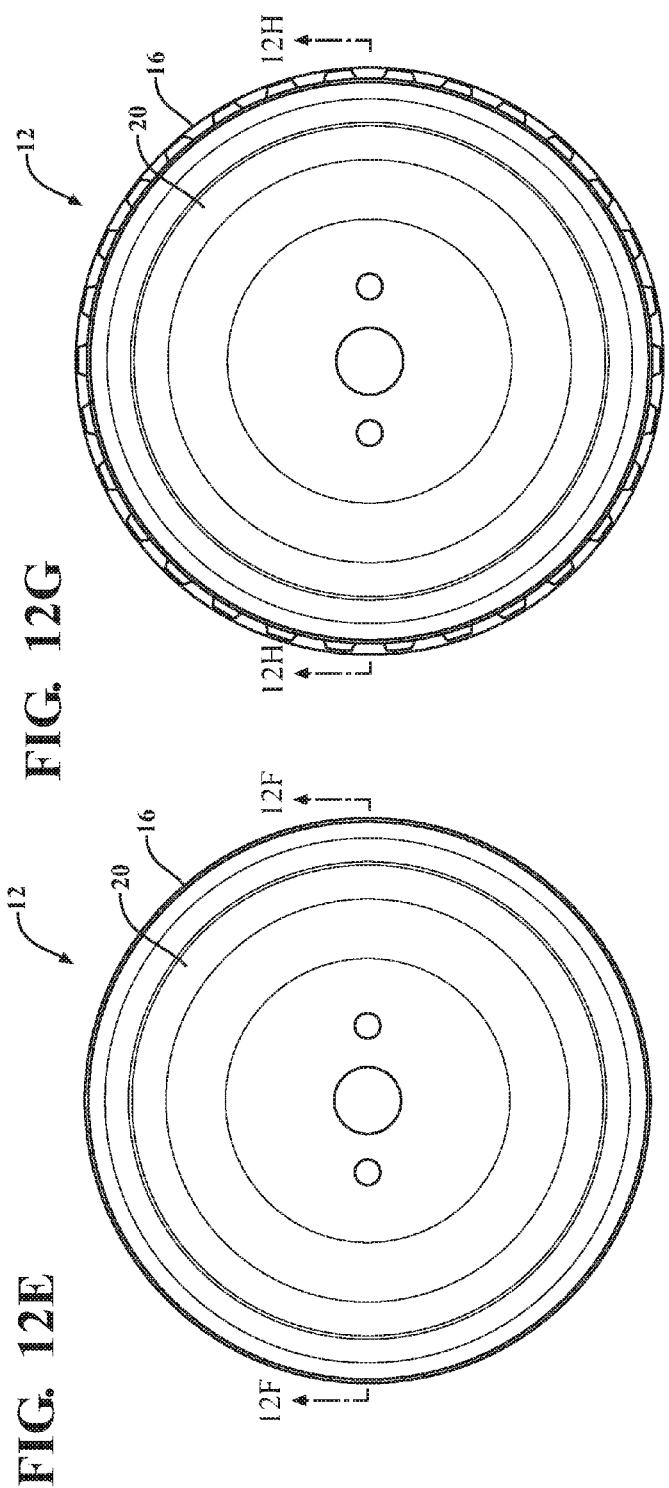
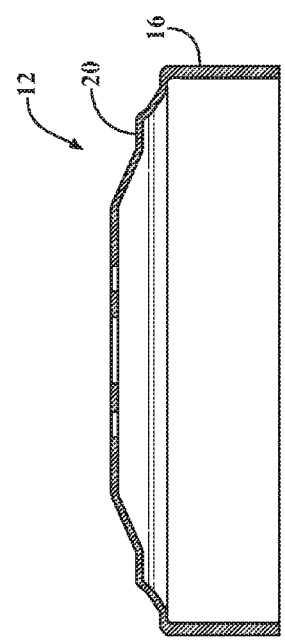
FIG. 12F  FIG. 12H

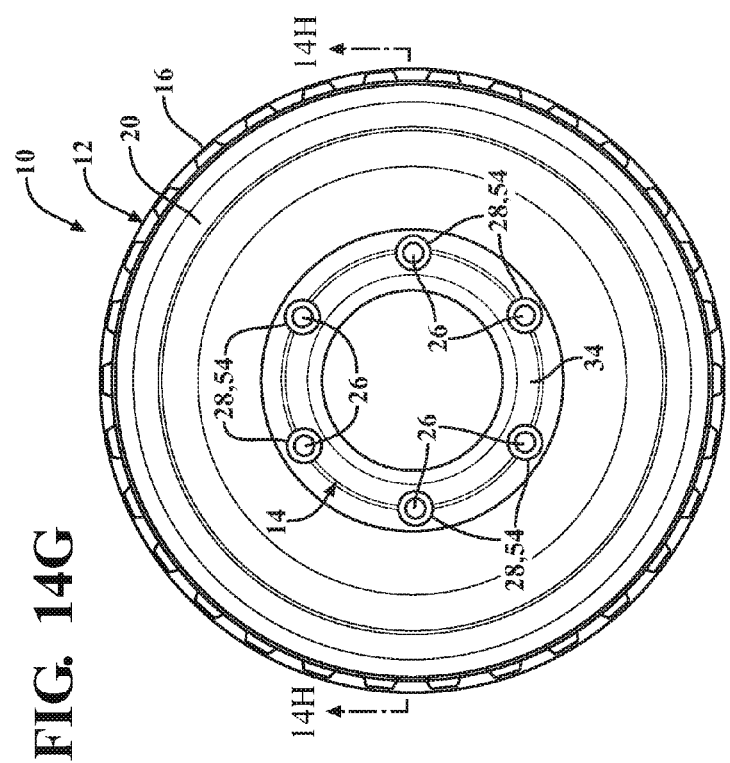
FIG. 14E      FIG. 14G
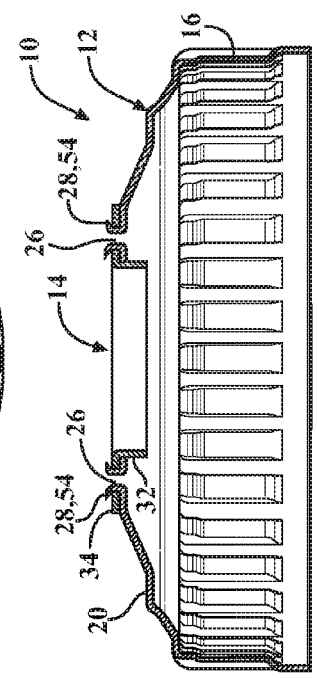
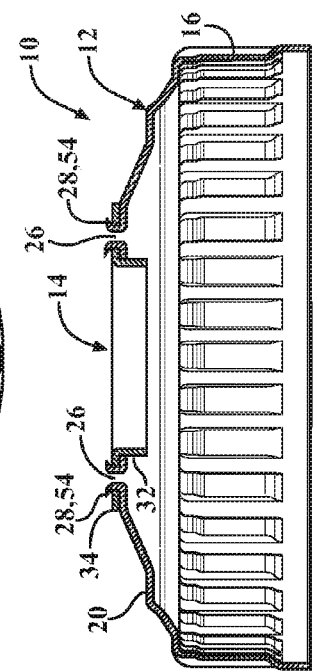
FIG. 14F      FIG. 14H

CLUTCH RING GEAR ASSEMBLY AND METHOD OF CONSTRUCTION THEREOF

BACKGROUND OF THE INVENTION

1. Field of the Invention

The present disclosure relates generally to vehicle clutch assemblies, and more particularly to ring gear assemblies including a ring gear carrier fixedly attached to a separate bearing seat and to their methods of construction.

2. Related Art

This section provides background information related to the present disclosure which is not necessarily prior art.

It is known to construct a clutch ring gear assembly for a transmission clutch assembly, wherein the clutch ring gear assembly includes a ring gear carrier fixedly attached to a separate bearing seat, also referred to as a bearing hub or simply hub. One known mechanism employed for fixedly attaching a ring gear carrier to a bearing seat includes welding the ring gear carrier to the bearing seat. However, welding can be costly, and further yet, a weld joint formed thereby results in hardened heat-affected zones, thereby impacting the material properties of the separate components in ways unintended, and can further result in heat distortion of parts and contamination from splatter. Another known mechanism employed for fixedly attaching a ring gear carrier to a bearing seat includes using a spline and snap ring arrangement; however, this increases the complexity of the assembly, increases the number of component parts required, increases the cost associated with assembly, and requires an undesirable increase in the axial space or envelop of the assembly. Yet another known mechanism employed for fixedly attaching a ring gear carrier to a bearing seat is taught in U.S. Pat. No. 9,022,196, wherein a plurality of circumferentially aligned and enclosed rectilinear slots are formed in a ring gear, with the increased length of the slot extending circumferentially and the decreased width extending radially, and a corresponding plurality of solid protrusions, having a similar rectilinear shape as the rectilinear slots, on a bearing seat are fixed within the slots. The protrusions are formed to extend from the bearing seat for receipt in the rectilinear slots, whereupon ends of the protrusions are punched by an anvil to form circumferentially extending grooves in the ends of the protrusions, causing material of the protrusions to be displaced to form radially outwardly and inwardly extending segments. However, due to the configurations of the slots, the protrusions, and the resulting assembly, problems exist, namely, the process associated with the manufacture of the rectilinear slots is complex, both from a tooling and forming extent, and the cost associated with the manufacture is high. Further yet, the grooves formed in the ends of the protrusions form a source for crack propagation, both during manufacture, thereby resulting in scrap, or while in use of the vehicle, thereby resulting in a potential need to service the vehicle.

A clutch ring gear constructed in accordance with the invention addresses at least those problems discussed above, as well as others that will be readily apparent to those possessing ordinary skill in the art of clutch assemblies.

SUMMARY OF THE INVENTION

This section provides a general summary of the disclosure and is not intended to represent a comprehensive summary of all of its features, advantages, aspect and/or objectives.

It is an aspect of the present disclosure to provide a clutch ring gear assembly having a bearing seat including a flange extending radially outwardly from a central axis, with the flange having a plurality of holes spaced circumferentially from one another about the central axis. Further having a ring gear carrier including a rim extending radially outwardly from the central axis, with the rim having a plurality of through openings. Each of the through openings has an annular boss extending axially away from the rim in generally parallel relation to the central axis. The annular bosses are configured for receipt through the holes and have annular, hollow end portions flared radially outwardly into engagement with the flange of said bearing seat to fixedly attach the ring gear carrier to the bearing seat.

It is another aspect of the present disclosure to provide the flared end portions of the bosses being flared to a frustro-conical shape to facilitate retaining the ring gear carrier in fixed attachment with the bearing seat.

It is another aspect of the present disclosure to provide the holes having annular, conically tapered edges, with the annular, radially outwardly flared end portions being engaged with the tapered edges.

It is another aspect of the present disclosure to provide the annular bosses being entirely hollow.

It is another aspect of the present disclosure to provide the ring gear carrier having a cylindrical outer wall, with the rim extending radially inwardly from the cylindrical outer wall.

It is another aspect of the present disclosure to provide the bearing seat having a cylindrical inner wall, with the flange extending radially outwardly from the cylindrical inner wall.

It is another aspect of the present disclosure to provide the bearing seat and the ring gear carrier as dissimilar materials.

It is another aspect of the present disclosure to provide the bearing seat and the ring gear carrier as similar materials.

It is another aspect of the present disclosure to provide the bosses including annular concave, radially outwardly facing channels bounded by the radially flared end portions and the rim, wherein the flange of the bearing seat is fixed about its entire periphery in the annular concave channels by the overlying radially flared end portions, thereby forming a reliable, secure fixation of the bearing seat to the ring gear carrier.

It is another aspect of the present disclosure to provide the holes having a rounded edge transitioning to one side of the flange and a tapered edge transitioning to an opposite side of the flange, wherein the rounded edge conforms to a fillet radius of the bosses to form a snug, tight fit therebetween and the tapered edge conforms to the radially flared end portions of the bosses to form a snug, tight fit therebetween, thereby forming a reliable and secure attachment of the ring gear carrier to the bearing seat.

It is another aspect of the present disclosure to provide the holes as circular openings and to provide the bosses having a corresponding cylindrical outer surface for close receipt within the circular openings, thereby forming a relatively low stress, stress riser free connection between the holes and the bosses.

It is another aspect of the present disclosure to provide a method of constructing a clutch ring gear assembly. The method includes forming a bearing seat having a flange extending radially outwardly from a central axis; forming a plurality of holes through the flange in circumferentially spaced relation from one another about the central axis; forming a ring gear carrier having a rim extending radially outwardly from a central axis; forming a plurality of through openings in the rim and forming each of the through openings having an annular boss extending axially away from the rim; disposing each of the annular bosses through the holes of the bearing seat; and flaring end portions of the bosses radially outwardly into engagement with the flange of the bearing seat to fixedly attach the ring gear carrier to the bearing seat.

It is another aspect of the present disclosure to include forming the end portions having a hollow, frustroconical shape.

It is another aspect of the present disclosure to include forming the holes having a conically tapered edge and engaging the radially outwardly flared end portions with the tapered edge to provide a reliable, secure attachment of the bearing seat to the ring gear carrier.

It is another aspect of the present disclosure to include forming the annular bosses being entirely hollow, thereby reducing weight of the assembly while at the same time providing an ability to form a reliable, relatively low stress, stress riser free attachment of the bearing seat to the ring gear carrier.

It is another aspect of the present disclosure to include forming the ring gear carrier having a cylindrical outer wall with the rim extending radially inwardly from the cylindrical outer wall.

It is another aspect of the present disclosure to include forming the bearing seat having a cylindrical inner wall with the flange extending radially outwardly from the cylindrical inner wall.

It is another aspect of the present disclosure to include forming the bosses having annular concave channels bounded by the radially flared end portions and the rim and fixing the flange of the bearing seat in the annular concave channels to provide a reliable, secure attachment of the bearing seat to the ring gear carrier.

It is another aspect of the present disclosure to include forming the holes having rounded edges transitioning to one side of the flange and a tapered edges transitioning to an opposite side of the flange with the rounded edges conforming to a fillet radius of the bosses and the tapered edge conforming to the radially flared end portions of the bosses such that the radially flared end portions extend about the entirety of the circumference of the tapered edges in abutment therewith to enhance the ability to provide a reliable, secure attachment of the bearing seat to the ring gear carrier.

It is another aspect of the present disclosure to include forming the bearing seat having a cylindrical inner wall with the flange extending radially outwardly from the cylindrical inner wall.

It is another aspect of the present disclosure to include attaching the ring gear carrier to the bearing seat in a transfer die process, thereby streamlining and simplifying the manufacture process, thus, reducing the cost associated with manufacture.

Further areas of applicability will become apparent from the description provided herein. The description and specific examples in this summary are intended for purposes of illustration only and are not intended to limit the scope of the present disclosure.

DETAILED DESCRIPTION OF PRESENTLY PREFERRED EMBODIMENTS

Referring in general to all of the figures, the present disclosure and teachings described herein are directed to clutch assemblies, and in particular, ring gear assemblies therefor, of the type particularly well-suited for use in motor vehicle applications. While disclosed in accordance with one or more specific exemplary constructions, a clutch ring gear assembly 10 of the present disclosure may be configured for operable use in any desired vehicle platform. The inventive concepts disclosed are generally directed to an improved connection and method of forming a connection between a ring gear carrier 12 and a bearing seat 14 of the ring gear assembly 10 for vehicle clutch assemblies. The improved connection and method of forming the connection is economical in manufacture and provides a reliable, strong and durable connection between the ring gear carrier 12 and bearing seat 14 to enhance the useful life the assembly 10.

Figure 12I:
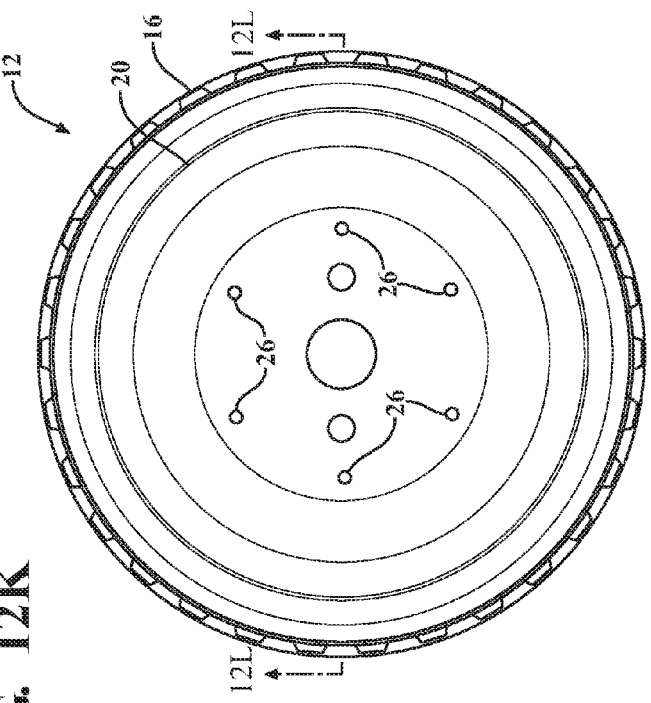
FIGS. 12A-12P illustrate a transfer die process for forming the ring gear carrier of the clutch ring gear assembly of FIG. 1.
Figure 12J:
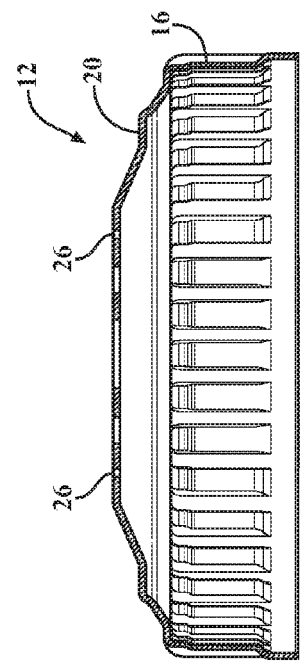
Figure 12K:
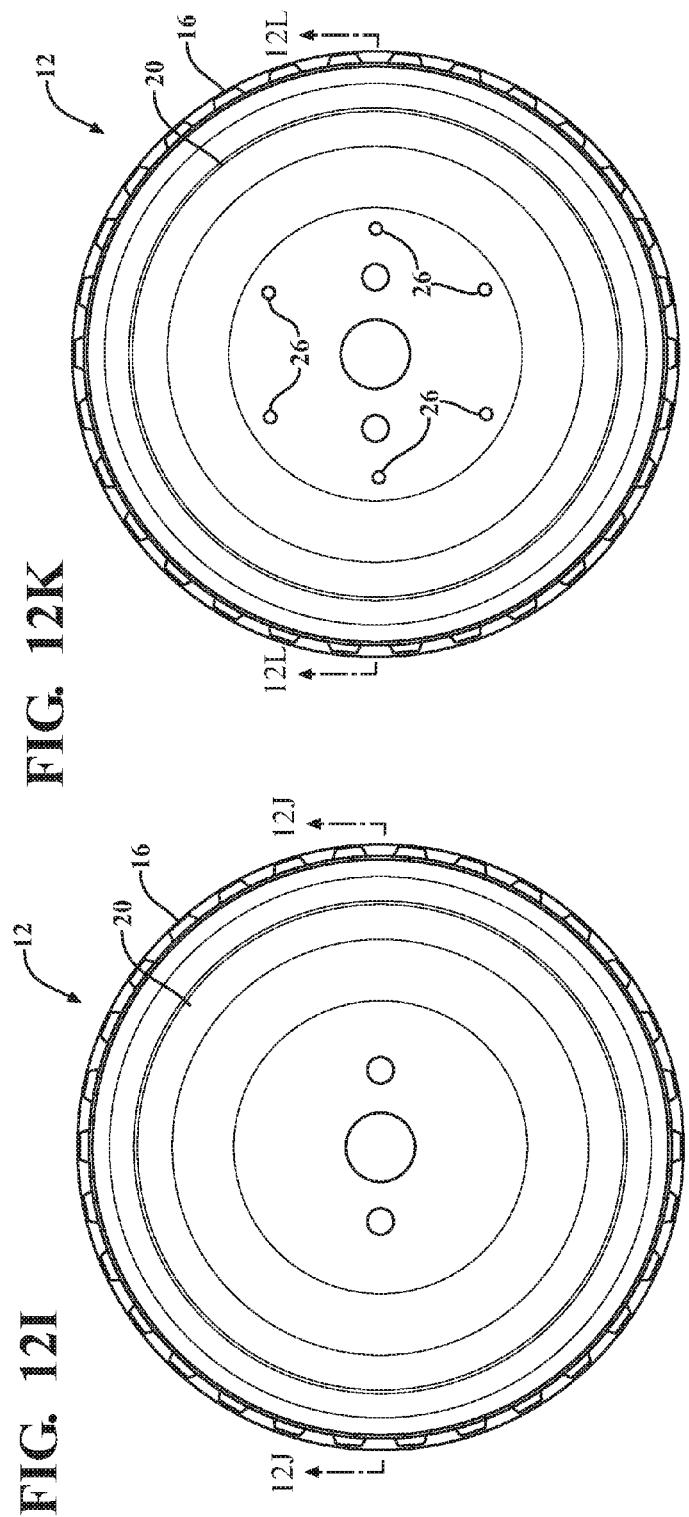
Figure 12L:
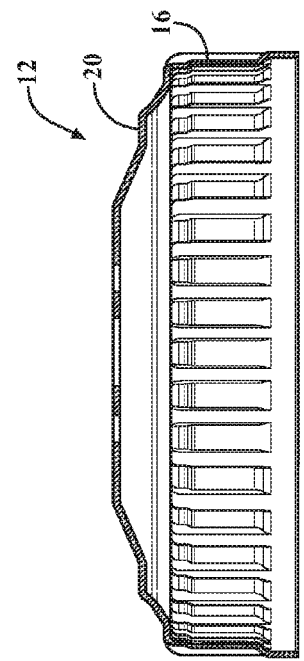
Figure 12M:
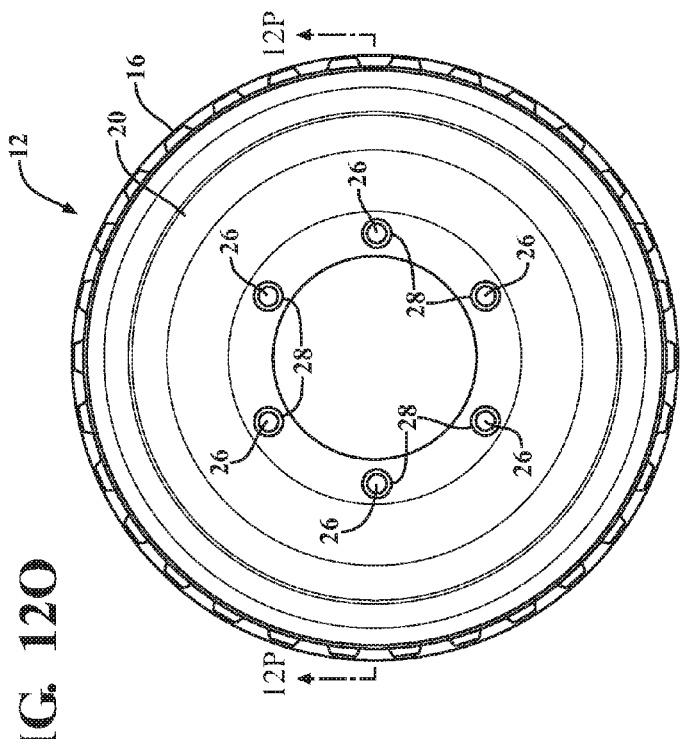
Figure 12N:
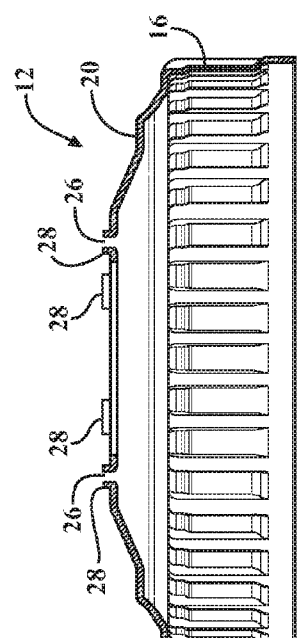
Figure 12O:
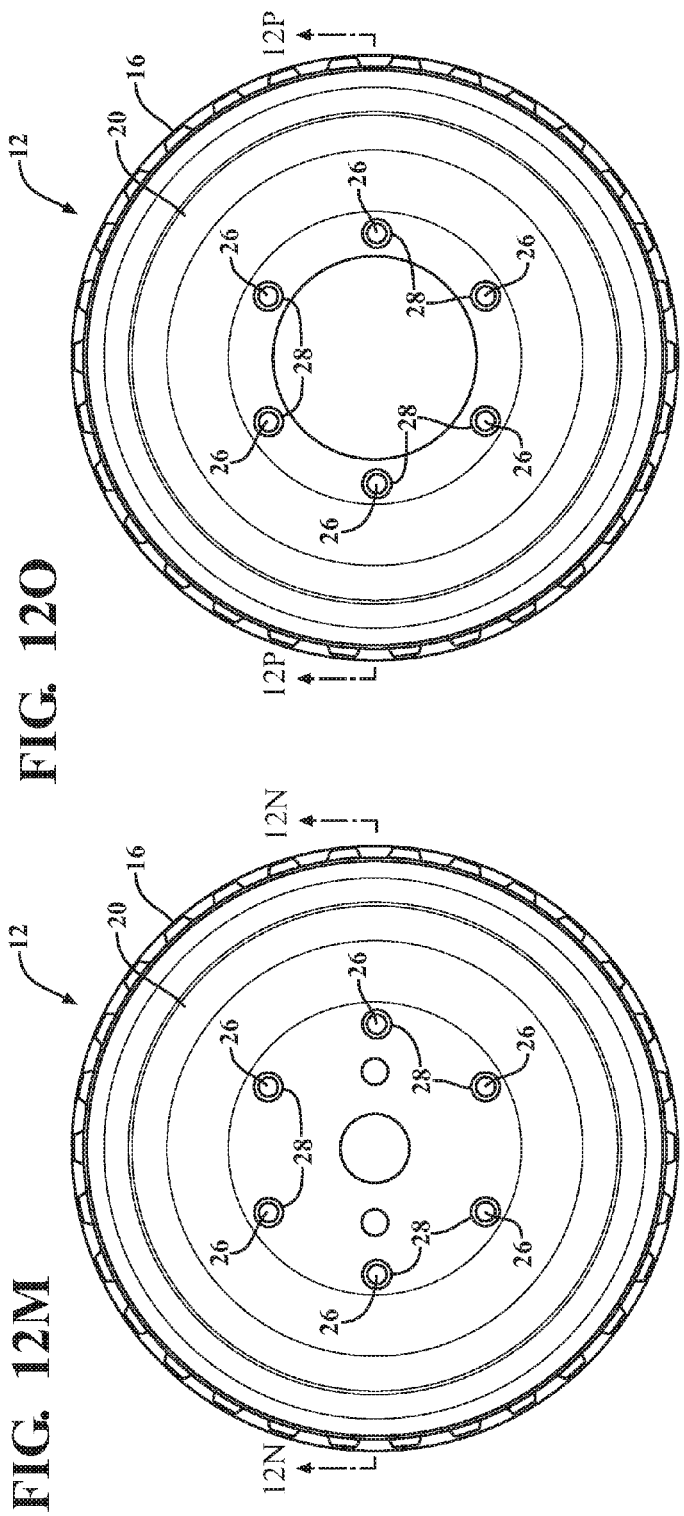
Figure 12P:
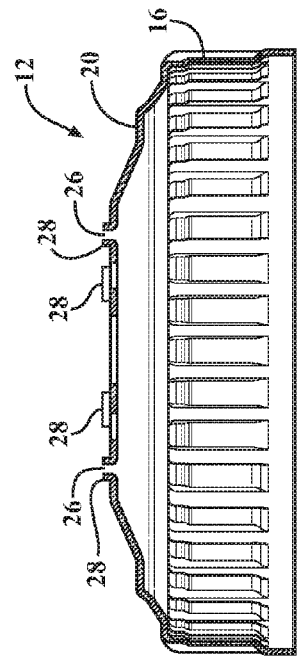

The ring gear carrier 12 can be constructed of any suitable metal material, including aluminum or steel, by way of example and without limitation. The ring gear carrier 12 can be constructed in a progressive transfer die process, such as shown in FIGS. 12A-12P, by way of example and without limitation. In the forming process, the ring gear carrier 12 is formed having a generally cylindrical outer wall 16 that extends generally parallel about a central axis 18 with an annular radially disposed portion or flange, also referred to as rim 20, extending radially inwardly from the generally cylindrical outer wall 16 to an annular inner periphery 22. The rim 20 separates, at least in part, a front side FS of the clutch ring gear assembly 10 from a back side BS of the assembly 10 and bounds a central opening 24 sized for receipt of at least a portion of the bearing seat 14 therein. In the continuous transfer die process shown, FIGS. 12A-12D show respective first and second drawing processes; FIGS. 12E-12F show a further drawing process and radii re-striking process; FIGS. 12G-12J show rolling processes wherein an outer surface of the cylindrical outer wall 16 is contoured; FIGS. 12K-12L show a further rolling process and a piercing process that is used to initiate forming the through openings 26; FIGS. 12M-12N show a process for completing the through holes 26 and bosses 28; and FIGS. 12O-12P show a process for forming the annular inner periphery 22. It is contemplated herein that fewer or additional processes could be used in a transfer die process in accordance with the invention. It is also contemplated that other processes could be used to form the ring gear carrier 12 within the spirit of the invention.

Figure 10A:
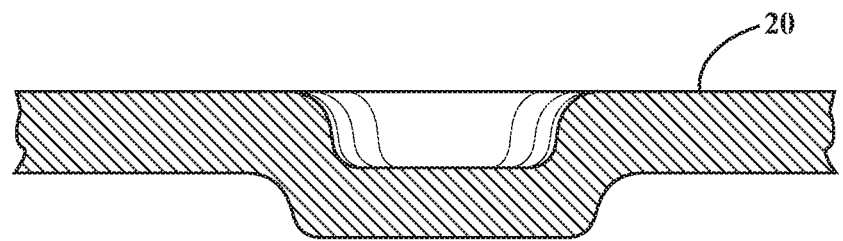
FIGS. 10A-10C illustrate a process, in accordance with one aspect of the invention, for forming through holes in the ring gear carrier with annular bosses extending outwardly from a rim of the carrier.
Figure 10B:
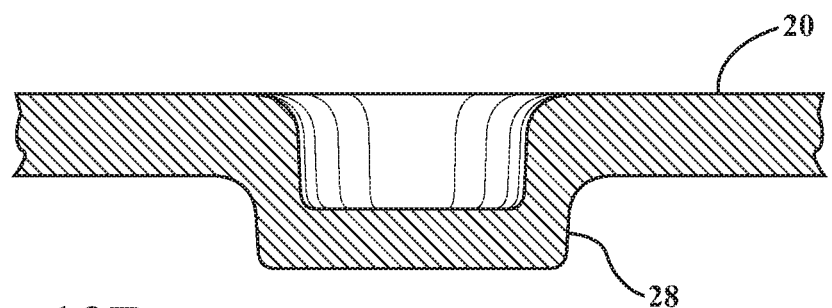
Figure 10C:
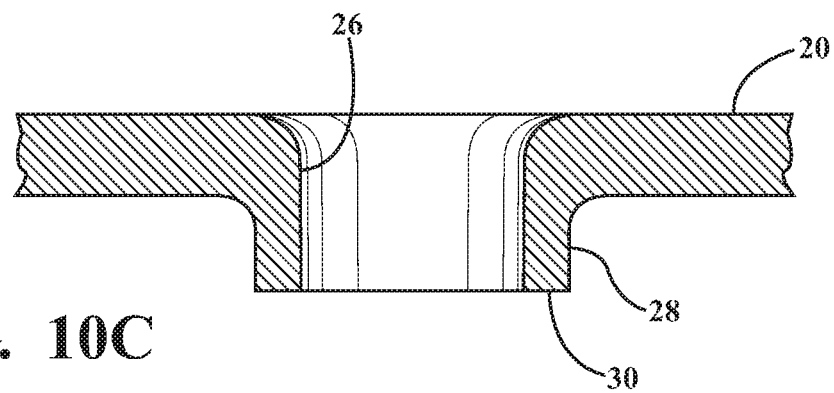
Figure 11C:
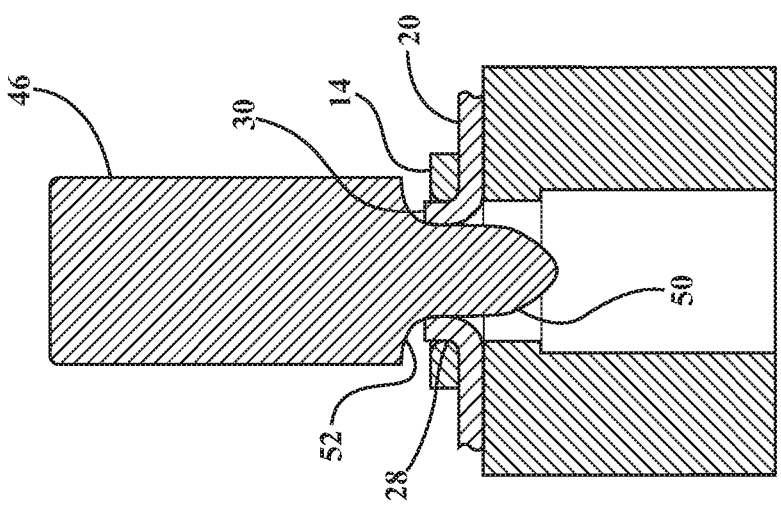
FIG. 11C illustrates a method, in accordance with one aspect of the invention, for attaching the ring gear carrier to the bearing seat.
Figure 11B:
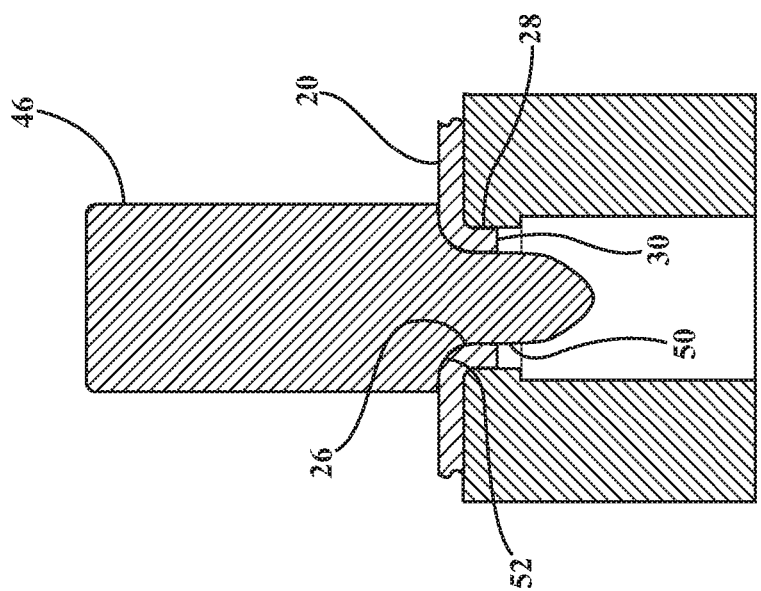
FIGS. 11A-11B illustrate another process, in accordance with another aspect of the invention, for forming through holes in the ring gear carrier with annular bosses extending outwardly from a rim of the carrier.
Figure 11A:
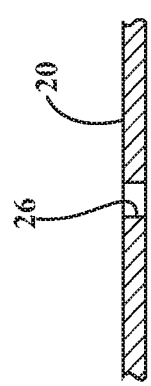

The rim 20 has opposite sides 21, 23, with the side 21 facing the front side FS and the opposite side 23 facing the back side BS. In an example embodiment, a plurality of through openings 26 is formed extending through the sides 21, 23 of the rim 20 adjacent the annular inner periphery 22. The through openings 26 are bounded circumferentially, and as such, are wholly surrounded by material of the rim 20. The through openings 26 can be formed in any desired number and arrangement, and in an example embodiment, a plurality of six through openings 26 are formed in circumferential alignment with one another and in equidistantly spaced relation from one another. However, it is contemplated that the through openings 26 could be arranged otherwise, including being radially staggered from one another, thus, not being in circumferential alignment, and being spaced in non-uniform relation from one another, if desired for the intended application. The through openings 26 are preferably formed, at least in part, in a material displacement process, such as a drawing and piercing process (FIG. 10A-10C) or in a piercing and punching process (FIG. 11A-11B), wherein material of the rim 20 is extended or deformed axially (with reference to the central axis 18) toward the back side BS, whereupon the through opening 26 is ultimately formed. As such, the through opening 26 is bounded by an axially extending, generally cylindrical wall forming an annular protrusion or boss 28 that terminates at an annular distal end, also referred to as free end 30, wherein the rim 20 extends radially inwardly from the bosses 28 to the annular inner periphery 22. The through openings 26 and bosses 28 form hollow, generally tubular passages, shown as being cylindrical, that extend axially between the opposite front and back sides FS, BS. With the bosses 28 being hollow, weight reduction of the assembly 10 can be recognized. The bosses 28 transition to the side 23, also referred to as back side, of the radially extending rim 20 via annular, arcuate concave radii, also referred to as fillets 29. In the forming embodiment of FIGS. 10A-10B, it can be seen that material is drawn in a cold forming process to form the desired geometry of the boss 28, and then, as shown in FIG. 10C, the base of the deep drawn material is pierced to complete formation of the through opening 26 and boss 28. In contrast, as shown in FIG. 11A, the through openings 26 can be first initiated, such as in a drilling or piercing operation, and then, as shown in FIG. 11B, a punch 46, having the desired configuration, including a nose portion 50 and a radially outwardly extending annular flared portion 52, can be used to first form the finished shape of the preassembled boss 28. Then, as discussed further hereafter, the same punch 46, or different if desired, can be used, as shown in FIG. 11C, to plastically deform an end region of the boss 28 to fixedly attach the ring gear carrier 12 to the bearing seat 14. Further discussion regarding the process of constructing the assembly 10 is provided hereafter.

Figure 1:
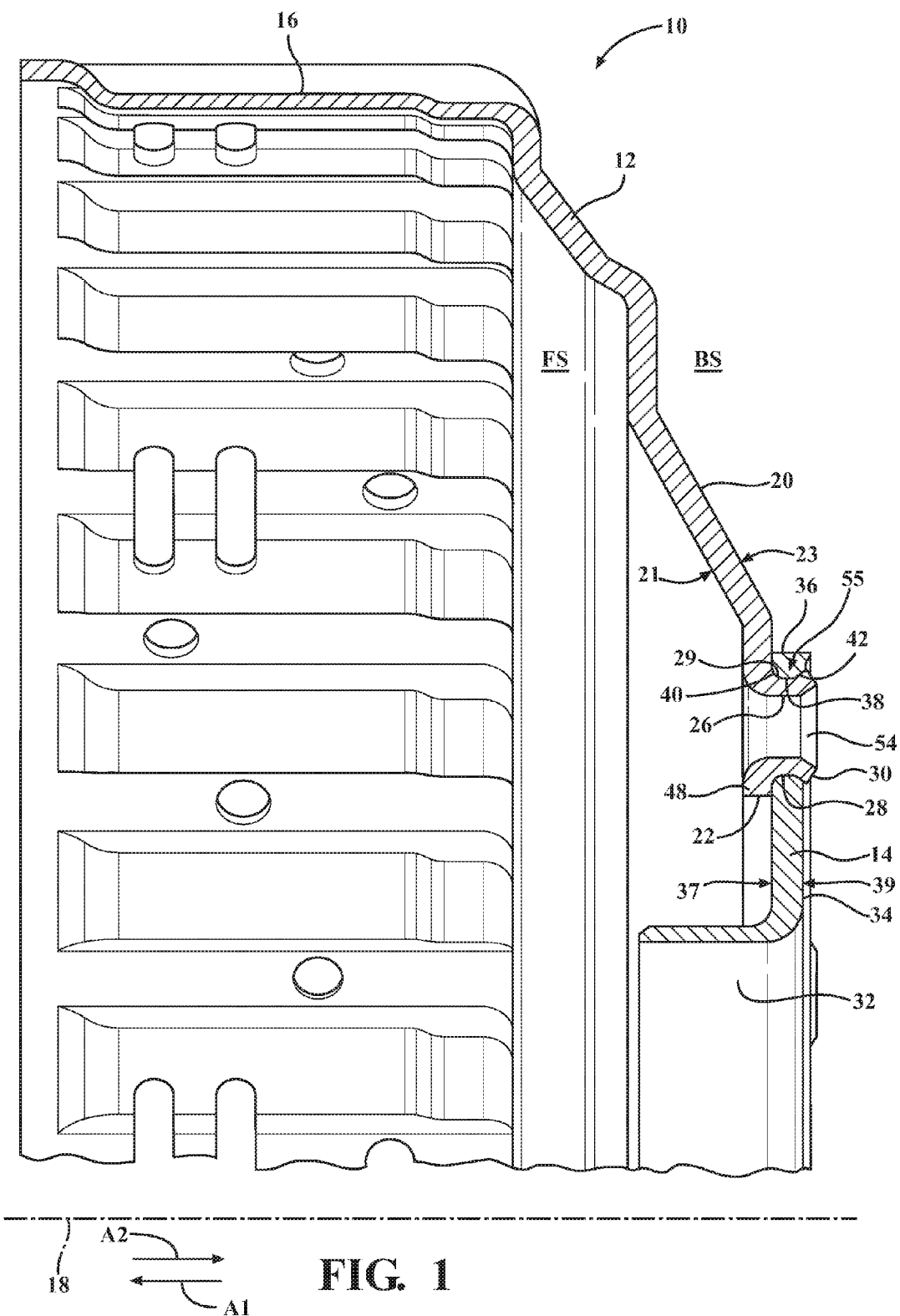
FIG. 1 is a fragmentary cross-sectional view of a clutch ring gear assembly constructed in accordance with one aspect of the invention.
Figure 2:
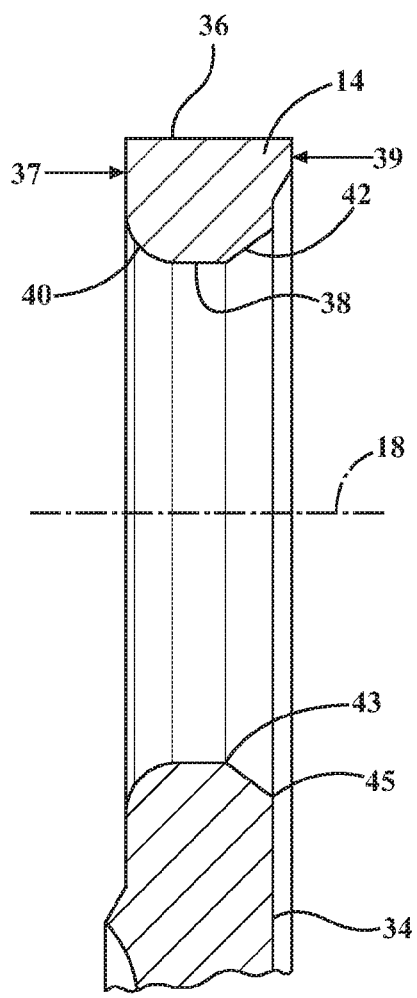
FIG. 2 is an enlarged fragmentary cross-sectional view of a bearing seat of the clutch ring gear assembly of FIG. 1.
Figure 4:
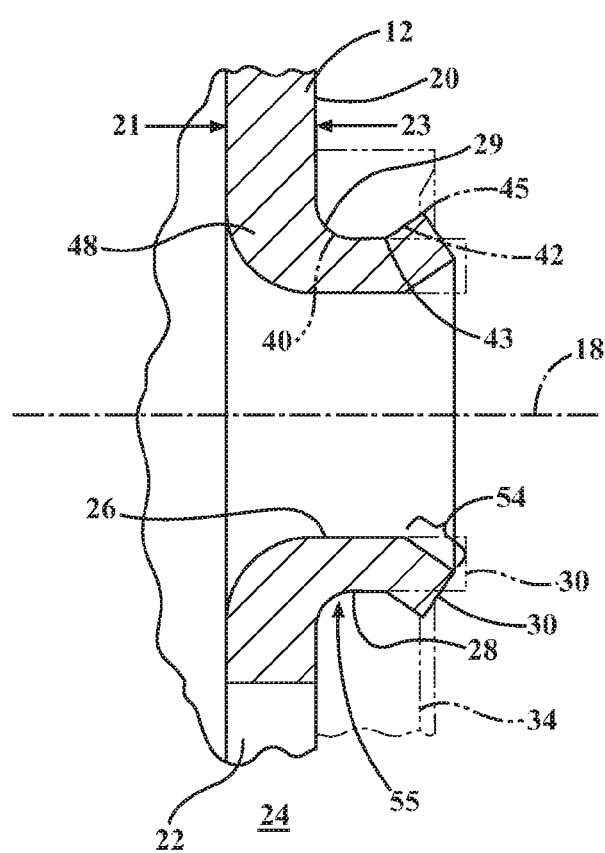
FIG. 4 is an enlarged fragmentary cross-sectional view of the encircled area 4 of FIG. 3 shown in solid line in an assembled state and shown in dashed line in a partially assembled state.

The bearing seat 14 is constructed, at least in part, of bearing grade metal, such as bearing grade steel, and as such, depending on what type of material is selected for the ring gear carrier 12, the bearing seat 14 and ring gear carrier 12 can be constructed of similar or dissimilar materials, thereby providing a wide range of options, as desired for the intended application. This can result in manufacturing and economic efficiencies if less costly materials are used for one of the components 12, 14. Dissimilar materials are able to be used primarily as a result of the improved connection mechanism used to fix the components 12, 14 to one another, which is generally not possible or reliable with welding mechanisms. The bearing seat 14 has an annular inner wall 32, shown as being a cylindrical, generally cylindrical or substantially cylindrical wall, that extends axially in generally parallel relation to the central axis 18 with an annular radially disposed portion, also referred to as flange 34, shown as being generally or substantially planar, extending radially and generally outwardly from the inner wall 32 and generally transversely away from the central axis 18 to an annular outer periphery 36 and having opposite sides 37, 39 separating the front side FS of the assembly 10 from the back side BS of the assembly 10, with the side 37 facing the front side FS and the opposite side 39 facing the back side BS. In an example embodiment, a plurality of through openings, also referred to as holes 38, are formed in the flange 34 adjacent the outer periphery 36. The holes 38 are bounded circumferentially, and as such, are wholly surrounded by material of the flange 34. The holes 38 are sized for receipt of the ring gear carrier annular bosses 28 therethrough, preferably in a line-to-line or slight clearance fit to facilitate assembly of the ring gear carrier 12 to the bearing seat 14. It is to be understood that the holes 38 are provided in a corresponding number, arrangement and spacing with the bosses 28 to allow the bosses 28 to be readily disposed into holes 38. It is further anticipated that the holes 38 can be shaped similarly as the outer surface of the bosses 28 to facilitate forming a close, snug fit therebetween to enhance the resistance of potential relative movement therebetween upon being fixed together. In an example embodiment, as best shown in FIG. 2, each hole 38 is circular and includes an annular, convex rounded edge 40 transitioning to the front side 37 of the flange 34 and an opposite annular, chamfered, also referred to as tapered or conical edge 42, diverging toward and transitioning to the back side 39 of the flange 34.

Figure 3:
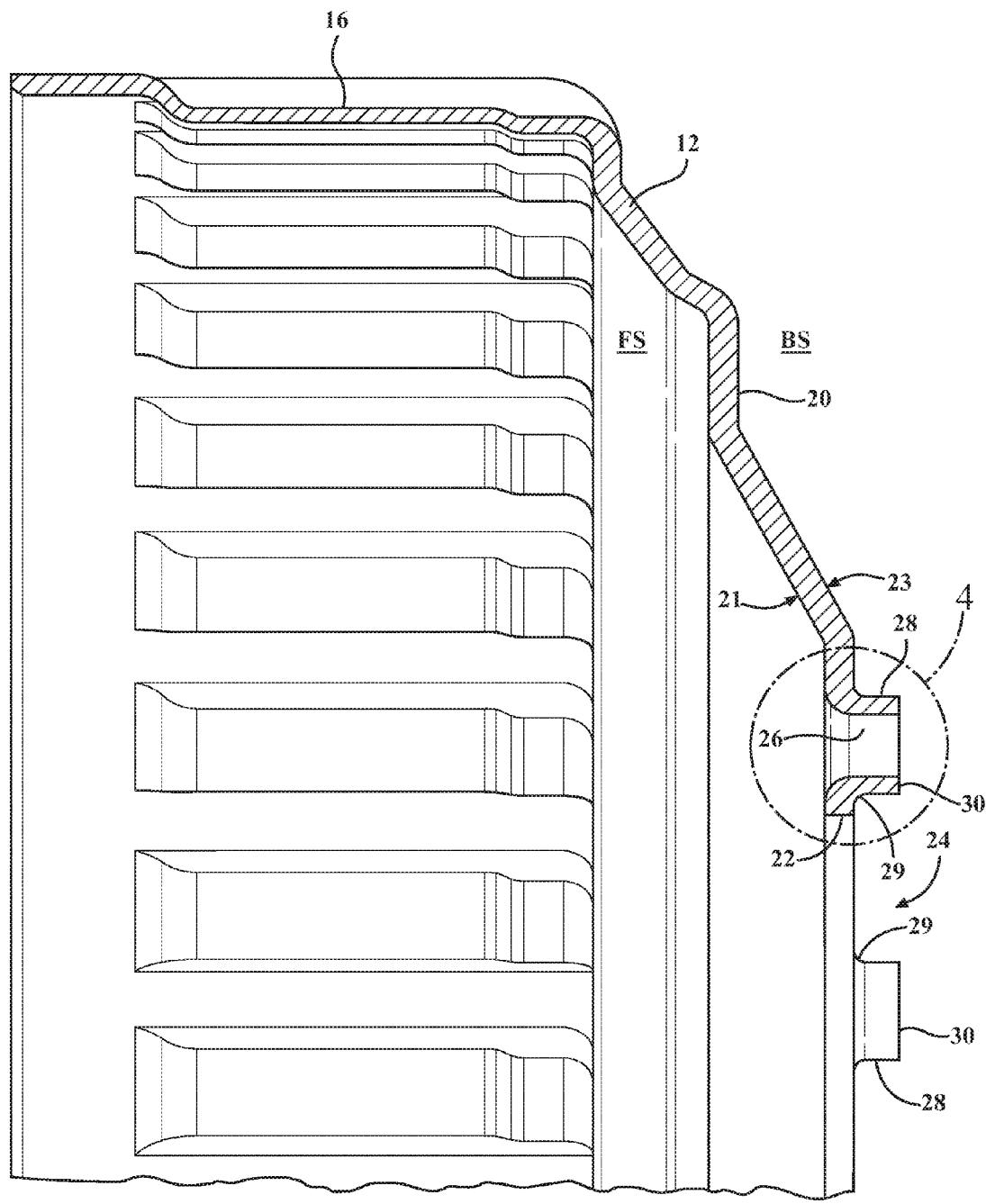
FIG. 3 is an fragmentary cross-sectional view of a ring gear carrier of the clutch ring gear assembly of FIG. 1 shown in a preassembled state.
Figure 5:
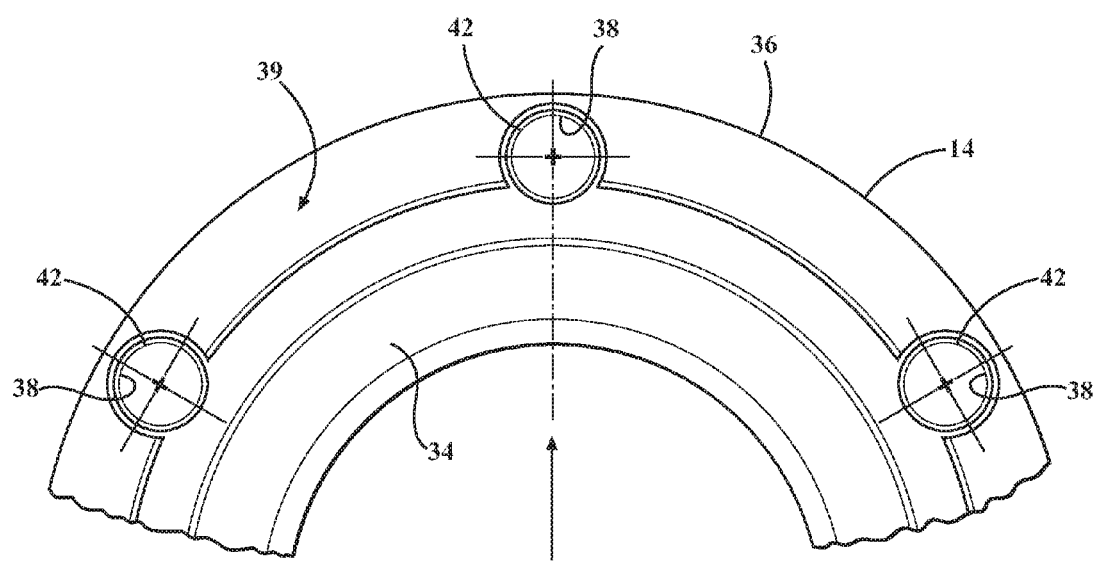
FIG. 5 is a fragmentary rear view of the bearing seat of FIG. 2.
Figure 6:
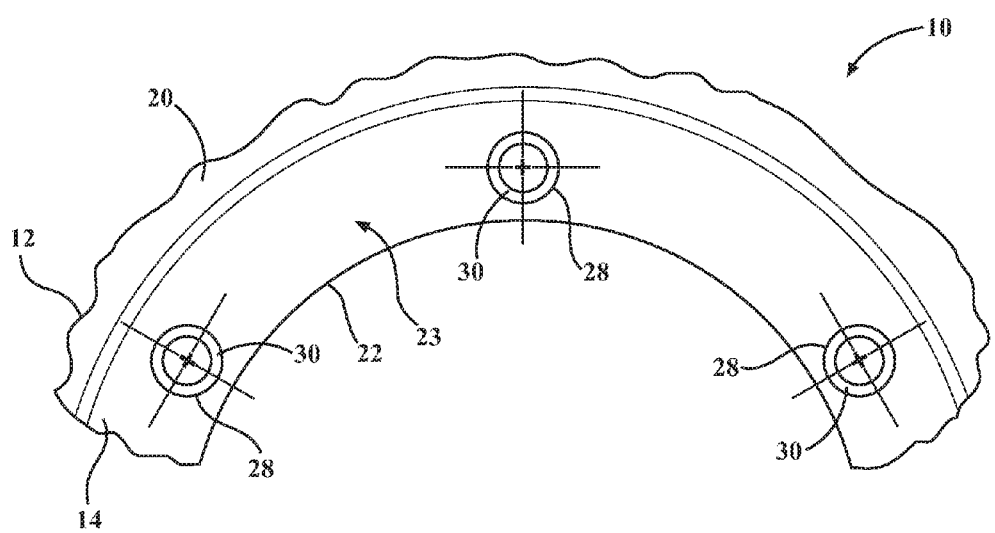
FIG. 6 is a fragmentary rear view of the ring gear carrier of FIG. 3.
Figure 7:
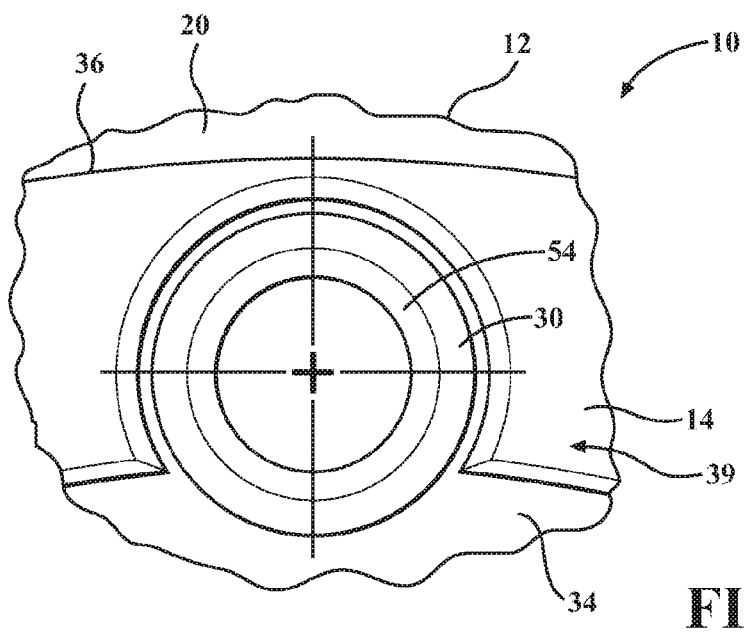
FIG. 7 is an enlarged fragmentary rear view showing a connection feature fixedly joining the bearing seat to the ring gear carrier.
Figure 9:
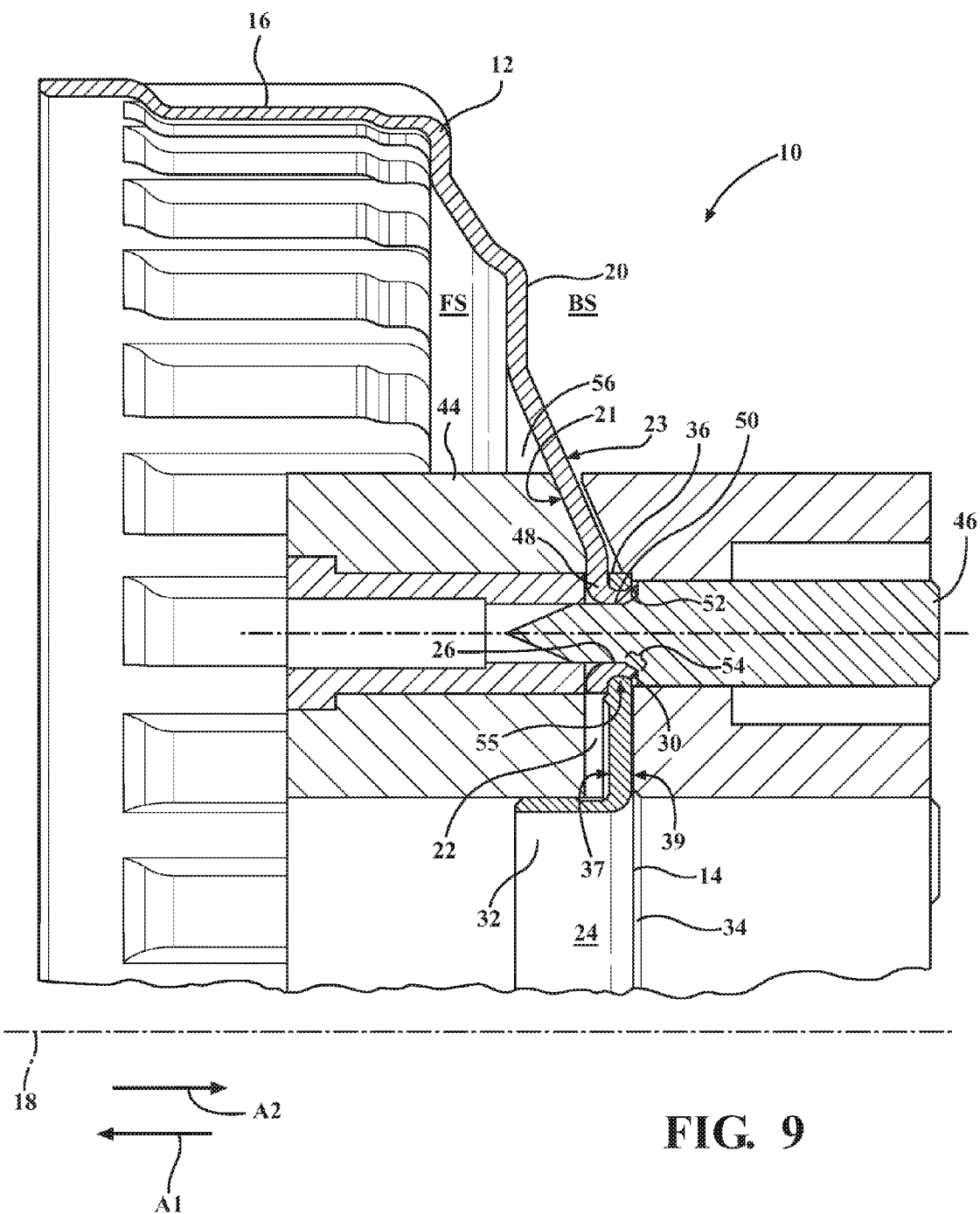
FIG. 9 is a fragmentary cross-sectional view illustrating a method, in accordance with one aspect of the invention, for fixedly joining the ring gear carrier to the bearing seat via a punch having a radially outwardly extending flaring surface.
Figure 13:
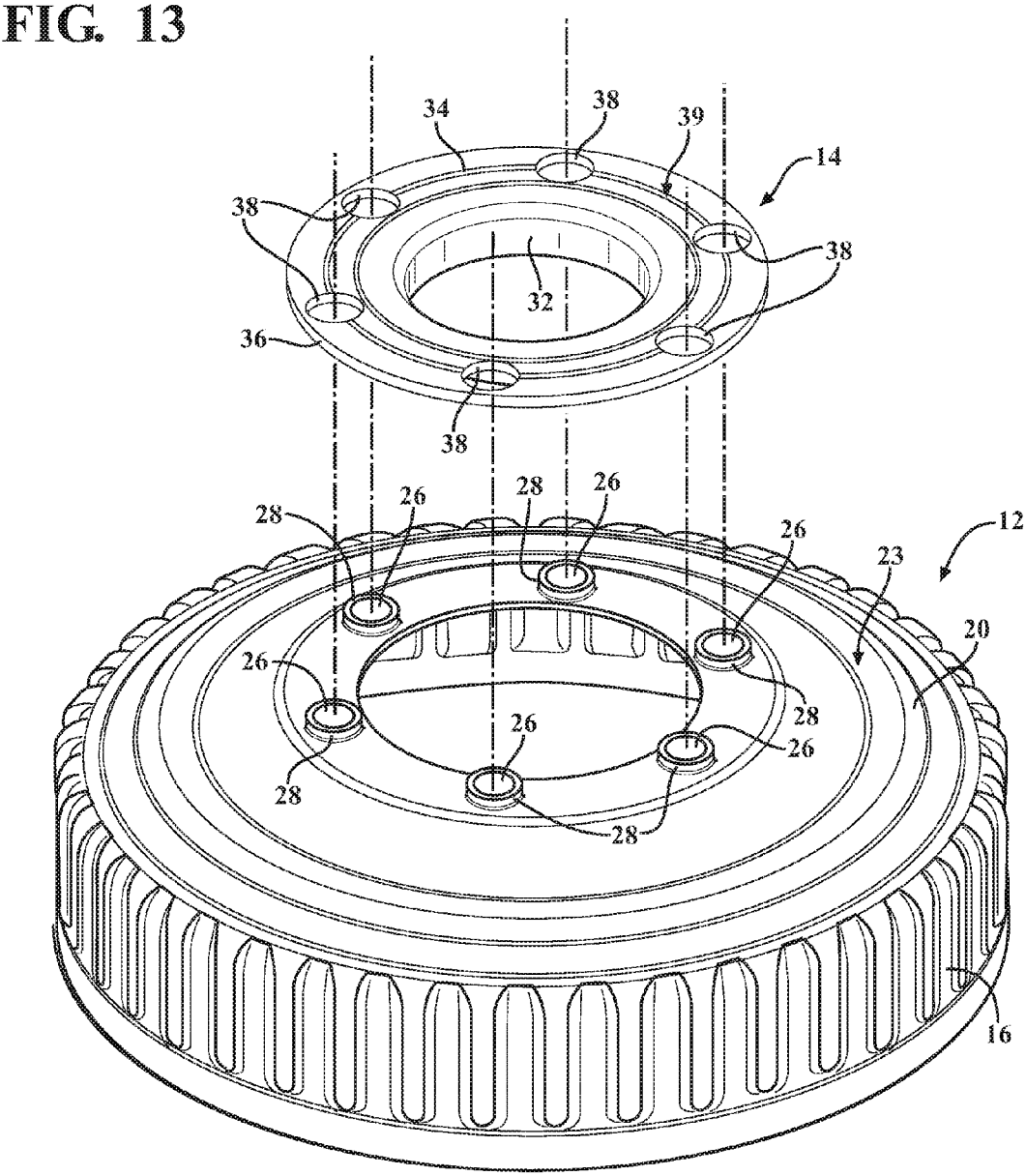
FIG. 13 is an exploded perspective view of the ring gear carrier and bearing seat of the clutch ring gear assembly of FIG. 1.
Figure 14A:
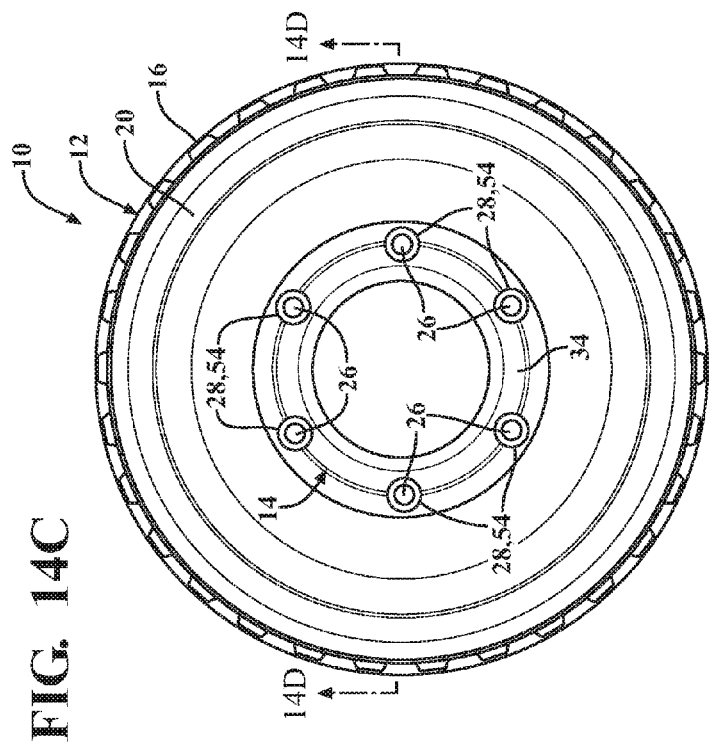
FIGS. 14A-14P illustrate a transfer die process for joining the ring gear carrier to the bearing seat and finishing the assembly thereof.
Figure 14B:
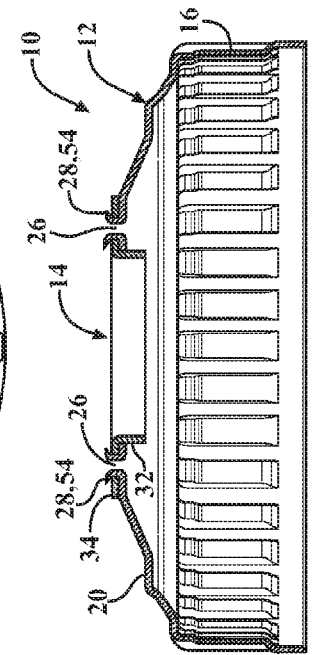

In an example embodiment, assembly of the ring gear carrier 12 to the bearing seat 14 includes aligning and inserting the bosses 28, while in a generally cylindrical form, such as shown in FIGS. 3 and 13, into the round or substantially round holes 38 such that the free ends 30 of the bosses 28 extend beyond a leading corner 43 (FIG. 2) of the tapered edge 42 and preferably slightly beyond a trailing or free corner 45 (FIG. 2) of the tapered edge 42. Then, as shown in FIG. 9 and in FIGS. 14A-14B of a continuous transfer die process line, upon bringing the front side 37 of the bearing seat 14 into compressed engagement with the back side 23 of the ring gear carrier rim 20 and disposing the bosses 28 fully into their respective holes 38 of the bearing seat 14, the convex, rounded edge 40 of each hole 28 is brought into mating, conforming or substantially conforming engagement with a corresponding concave fillet 29 of a respective boss 28, and a compressive force is exerted on or adjacent the free ends 30 of the bosses 28, such as via the aforementioned punch 46. As a result of the compressive force applied to the bosses 28, the free end portions 54 are plastically deformed and radially displaced radially outwardly, in outwardly flared fashion, into contact with the tapered edges 42 of the bearing seat 14. The flared end portions 54 take on a frustroconical shape, thereby fully wrapping around and capturing the peripheral edge of the holes 38 in the flange 34 of the bearing seat 14 between the flared end portions 54 and the rim 20 of the ring gear carrier 12, and bringing the side 37 of the bearing seat 14 facing the front side FS into compressed abutment against the side 23 of the ring gear carrier rim 20 facing the back side BS.

To facilitate the construction process, as shown in FIG. 9, a horn 44 can be inserted behind the ring gear carrier rim 20 against the side 21 opposite the bosses 28 to axially support the rim 20 and the bosses 28. The specially configured punch 46 applies force in axial direction A1 to the free end 30 each of the bosses 28 to compressively deform and engage the bosses 28 with the bearing seat 14. The horn 44 applies an equal and opposite force in the axial direction A2, and thus, limits axial motion of the ring gear carrier 12 so that the boss 28 is radially and circumferentially expanded within the round hole 38, and the concave corner 29 is pressed into contact with the convex corner 40 during the application of a suitable force by the punch 46, thus, resulting in the increase of a desired uniform compressive stress along segments 48. As noted above, the punch 46 includes the nose portion 50 sized for close receipt through the through opening 26 and into a hollow portion of the horn 44, and an annular flared portion 52 that extends radially outwardly from the nose portion 50. The annular flared portion 52 has an annular concave surface that impacts the boss free end 30 when in its straight cylindrical configuration and causes the free end 30 to deform along the path of the fared portion 52, thereby flaring the circular end portion 54 of the boss 28 radially outwardly in mating, conforming relation with the concavity of the punch flared portion 52. As the free end 30 is flared radially outwardly, the annular flared end portion 54 of the annular boss 28 immediately adjacent the free end 30 is caused to wrap or fold into compressed abutment with the tapered edge 42 of the hole 38 without being cut or sheared, and as a result, without forming potential sources of crack propagation in the form of grooves, indentions, or otherwise, which tend to act as stress risers. As a result of the flaring, the flange 34 of the bearing seat 14 is effectively clamped and fixed within an annular channel 55 bounded between the flared end portion 54 and the rim 20 of the ring gear carrier 12. Accordingly, the ring gear carrier 12 and the bearing seat 14 become reliably and securely fixedly joined to another against axial separation.

In general, any tensile force associated with torque loads on the assembly 10, in particular on segments 48, work to separate the bearing seat 14 from the ring gear carrier 12. Advantageously, with the creation of additional compressive stress in segments 48 and with the entirety of the outer periphery of the holes 38 being captured within the annular channels 55, the tensile forces are countered sufficiently, thereby increasing the torque capacity of assembly 10.

Figure 8:
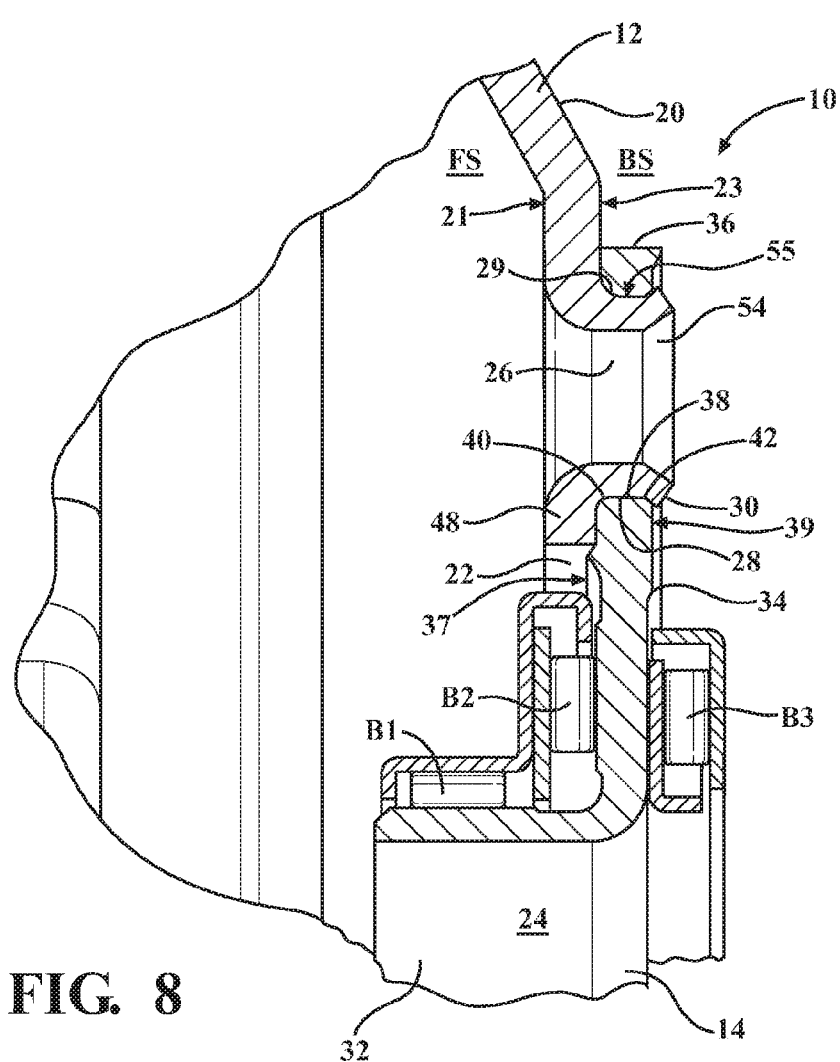
FIG. 8 is a fragmentary cross-sectional view similar to FIG. 4 showing an expanded region of the bearing seat with bearings riding on bearing surfaces thereof to accommodate radial and thrust loads in use.

FIG. 8 is a detail of showing bearings incorporated for rolling engagement against the bearing seat 14 of the assembly 10, wherein an example embodiment shows the assembly 10 as used in a transmission. In an example embodiment, bearings B1 are used to radially guide the assembly 10 and thrust bearings B2 and B3 are used to axially guide the assembly 10. As further described below, the fabrication of assembly 10 advantageously facilitates the hardening of surfaces of the bearing seat 14 upon which bearings B1, B2, B3 ride.

The following provides further detail and information regarding the ring gear assembly 10 and the fabrication of assembly 10. In an example embodiment, the tapered edges 42 are formed by any desired forming process, such as within the transfer die process, wherein the material of the bearing seat 14 is flared conically to act as a stop surface and conform to the flared portion 54 upon being compressed. As well, the forming process eliminates the need for machining of the bearing seat 14 in the areas of the bosses 28 to reduce the thickness. Machining could result in an interrupted cut that would require deburring at a substantial cost. By 'forming' we mean a process that produces the indented regions by compressing the material in the area of the tapered edges 42.

In an example embodiment, corners or rounded edges 40 and corners or fillets 29 also are formed by a forming process, such as in the continuous transfer die process, that is, by applying compressive force to form their respective radii of curvature, wherein the formed radii help to improve fill, that is, the expansion of the bosses 28 to fill the holes 38 and compressively engaged the bearing seat 14, and to better seat the bearing seat 14 and the ring gear carrier 12. In an example embodiment, once the bosses 28 are inserted into the holes 38, spring loaded, by way of example and without limitation, punch 46 provides the axial force discussed above, which press the bearing seat 14 and the ring gear carrier 12 together. During the application of the axial force an additional amount of residual compressive stress is put into the annular rounded edge 40 and segments 48. This residual compressive stress results in a durability improvement, that is, the compressive stress counteracts the tensile forces associated with operation of assembly 10.

In an example embodiment, as discussed above, while punch 46 is applying axially compressive force, the bosses 28 are fully supported by the horn 44 to prevent the bosses 28 from being pushed outwardly from the holes 38.

Advantageously, the configuration of the assembly 10 minimizes the axial extent of the ring gear carrier 12, in particular, the axial extent of space 56 needed to accommodate the horn 44. The assembly 10 also replaces welding of the bearing seat 14 to the ring gear carrier 12. Welding would undesirably increase cost and complexity for fabricating the assembly 10 and could result in undesirably heating, embrittlement, and possible warping of parts forming the assembly, as discussed above. Further, as mentioned above, welding typically requires similar materials to be used to form reliable weld joints, whereas the improved connection mechanism discussed and shown herein does away with such need for similar materials.

Figure 14C:
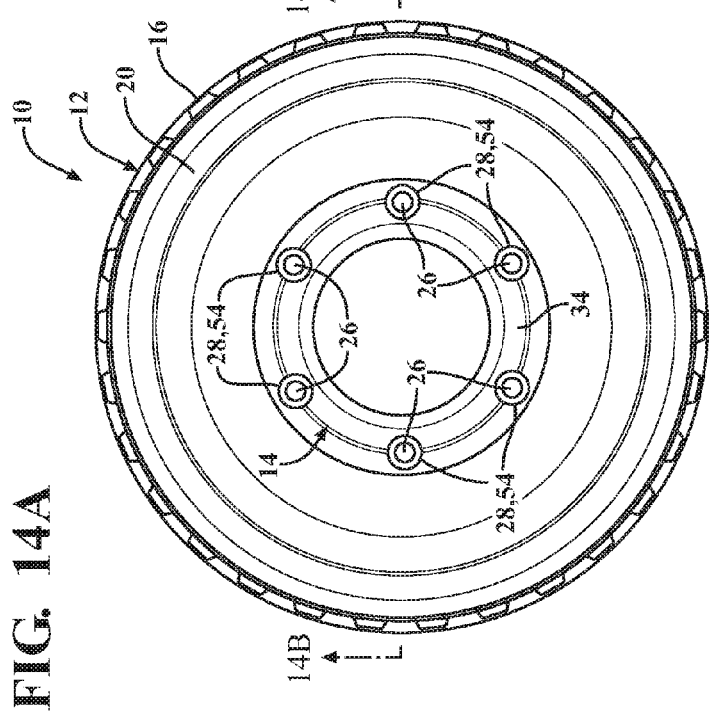
Figure 14D:
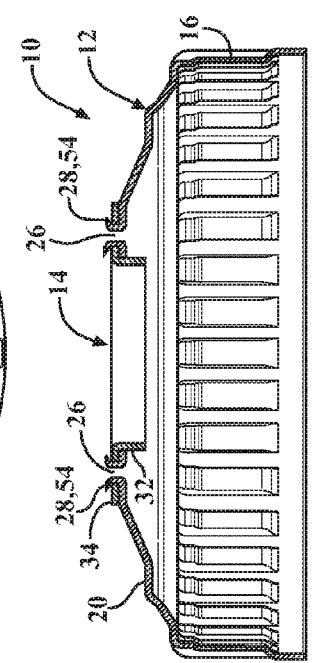
Figure 14I:
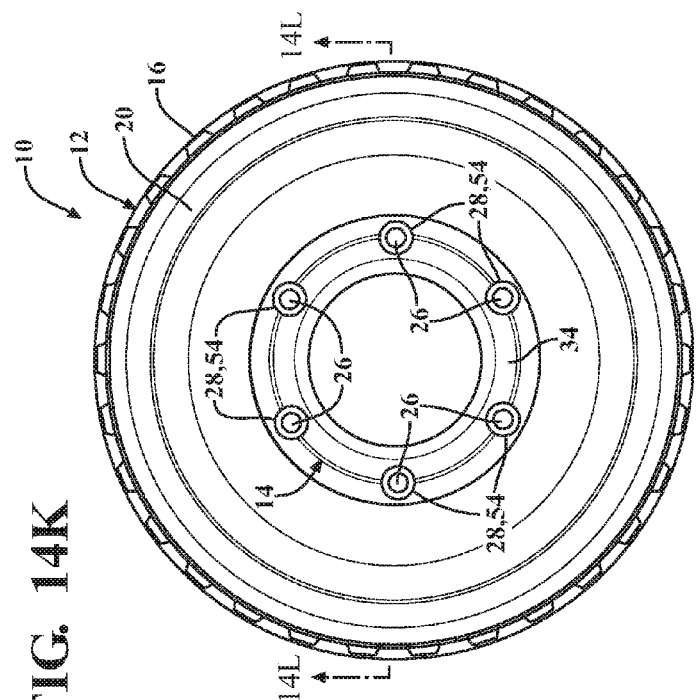
Figure 14J:
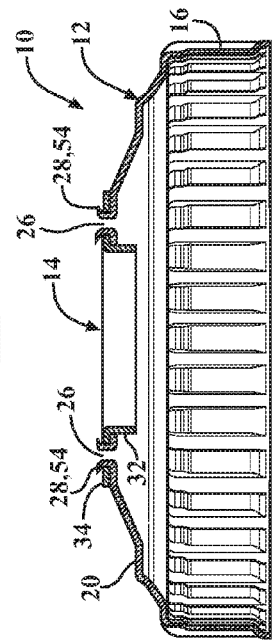
Figure 14K:
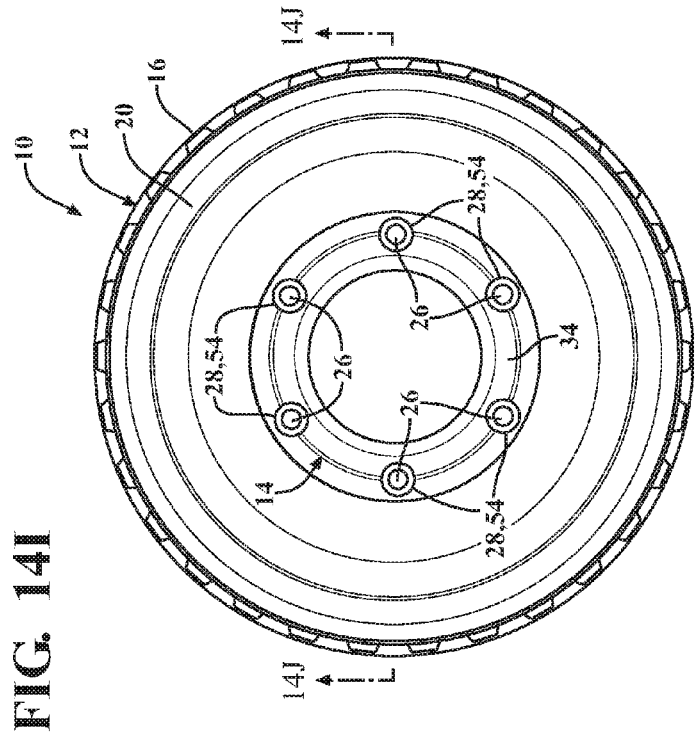
Figure 14L:
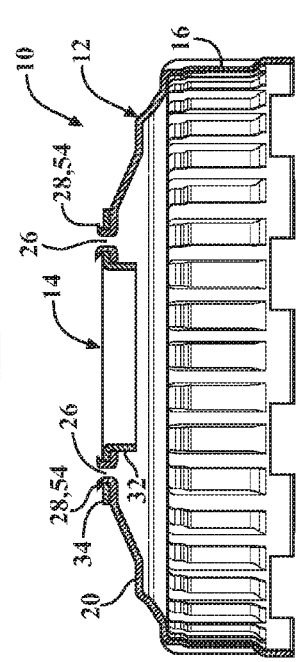
Figure 14M:
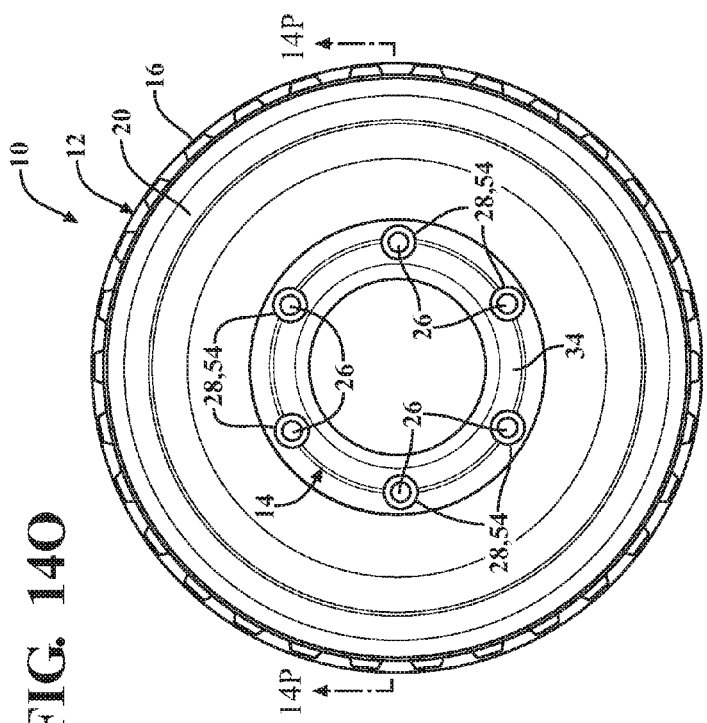
Figure 14N:
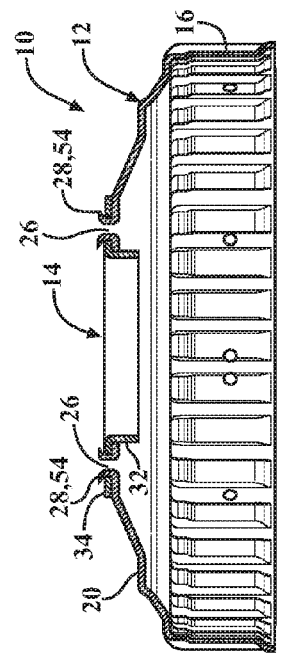
Figure 14O:
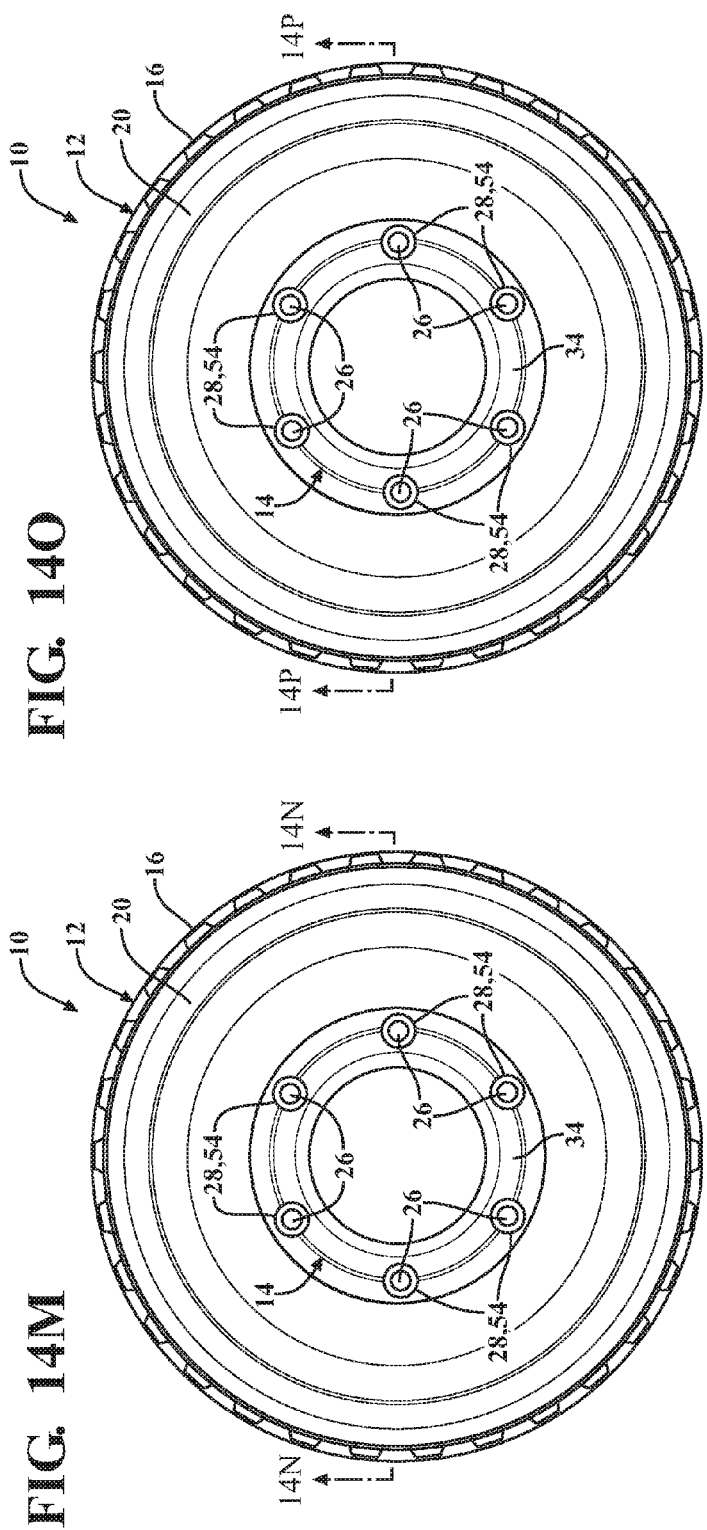
Figure 14P:
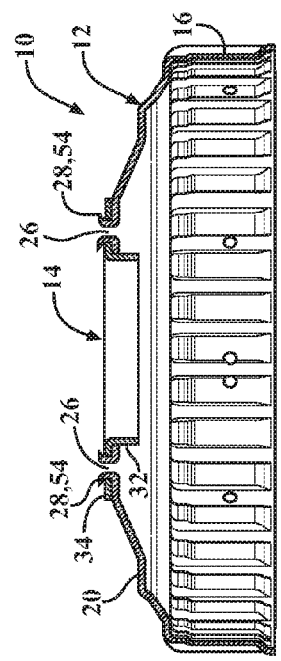

Upon fixing the ring gear carrier 12 to the bearing seat 14, further processes can be performed in the continuous transfer process, such as shown in FIGS. 14C-14P, by way of example and without limitation. For example, finish forming processes can be performed on the cylindrical outer wall 16 of the ring gear carrier 12, such as shown in FIGS. 14C-14F; final forming a spline and burls, such as shown in FIGS. 14G-14H; trimming and piercing, such as shown in FIGS. 14I-14P. It is contemplated herein that fewer or additional processes could be used in a transfer die process in accordance with the invention. It is also contemplated that other processes could be used to form the ring gear carrier assembly 10 within the spirit of the invention.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A clutch ring gear assembly, comprising: a bearing seat including a flange extending radially outwardly from a central axis, said flange having a plurality of holes spaced circumferentially from one another about said central axis; and a ring gear carrier including a rim extending radially outwardly from said central axis, said rim having a plurality of through openings, each of said through openings having an annular boss formed on and extending axially away from said rim in generally parallel relation to said central axis, said annular bosses being configured for receipt through said holes and having end portions flared radially outwardly at an acute angle greater than 0° and less than 90° into engagement with said flange of said bearing seat to fixedly attach said ring gear carrier to said bearing seat.

2. The clutch ring gear assembly of claim 1 wherein said end portions are frustroconical in shape.

3. The clutch ring gear assembly of claim 1 wherein said holes having a conically tapered edge, said radially outwardly flared end portions being engaged with said tapered edge.

4. The clutch ring gear assembly of claim 1 wherein said annular bosses are hollow.

5. The clutch ring gear assembly of claim 1 wherein said ring gear carrier has a cylindrical outer wall, said rim extends radially inwardly from said cylindrical outer wall.

6. The clutch ring gear assembly of claim 5 wherein said bearing seat has a cylindrical inner wall, said flange extends radially outwardly from said cylindrical inner wall.

7. The clutch ring gear assembly of claim 1 wherein said bosses include annular concave channels bounded by said radially flared end portions and said rim, said flange of said bearing seat being fixed in said annular concave channels.

8. The clutch ring gear assembly of claim 7 wherein each of said holes has a rounded edge transitioning to one side of the flange and a tapered edge transitioning to an opposite side of the flange, said rounded edge conforms to a fillet radius of said bosses and said tapered edge conforms to said radially flared end portions of said bosses.

9. The clutch ring gear assembly of claim 1 wherein said bearing seat has a cylindrical inner wall, said flange extending radially outwardly from said cylindrical inner wall.

10. A method of constructing a clutch ring gear assembly, comprising: forming a bearing seat having a flange extending radially outwardly from a central axis; forming a plurality of holes through said flange in circumferentially spaced relation from one another about said central axis; forming a ring gear carrier having a rim extending radially outwardly from a central axis; forming a plurality of through openings in said rim and forming each of said through openings with an annular boss extending axially away from said rim; disposing each of said annular bosses through said holes of said bearing seat; and flaring end portions of said bosses radially outwardly at an acute angle greater than 0° and less than 90° into engagement with said flange of said bearing seat to fixedly attach said ring gear carrier to said bearing seat.

11. The method of claim 10 further including forming said end portions to take on a frustroconical shape.

12. The method of claim 10 further including forming said holes to have a conically tapered edge and engaging said radially outwardly flared end portions with said conically tapered edge.

13. The method of claim 10 further including forming said annular bosses to be hollow.

14. The method of claim 10 further including forming said ring gear carrier to have a cylindrical outer wall with said rim extending radially inwardly from said cylindrical outer wall.

15. The method of claim 14 further including forming said bearing seat to have a cylindrical inner wall with said flange extending radially outwardly from said cylindrical inner wall.

16. The method of claim 10 further including forming said bosses to have outer surfaces with annular concave channels bounded by said radially flared end portions and said rim and fixing said flange of said bearing seat in said annular concave channels.

17. The method of claim 16 further including forming said holes to have rounded edges transitioning to one side of the flange and a tapered edges transitioning to an opposite side of the flange with said rounded edges conforming to a radius of said bosses and said tapered edge conforming to said radially flared end portions of said bosses.

18. The method of claim 10 further including forming said bearing seat to have a cylindrical inner wall with said flange extending radially outwardly from said cylindrical inner wall.

19. The method of claim 10 further including performing the flaring operation in a die transfer process.

20. The method of claim 19 further including performing forming steps on said ring gear carrier in the die transfer process after performing the flaring operation.

* * * * *